United States Patent [19]

Khatti et al.

[11] 4,083,382
[45] Apr. 11, 1978

[54] REGULATING VALVE WITH HYDRAULIC DETENT

[75] Inventors: Ramkishan Khatti; Donald K. Johnson, both of Racine, Wis.

[73] Assignee: J. I. Case Company, Racine, Wis.

[21] Appl. No.: 692,294

[22] Filed: Jun. 3, 1976

[51] Int. Cl.² .............................................. F17d 3/00
[52] U.S. Cl. .................... 137/596.12; 91/413;
137/596.2; 137/625.69; 251/94; 192/4 A;
192/13 R
[58] Field of Search ................... 192/4 A, 4 C, 13 R,
192/109 F, 12 C; 137/624.27, 625.69, 596.2;
91/413; 251/94, 297

[56] References Cited

U.S. PATENT DOCUMENTS

| 2,478,790 | 8/1949 | Stephens | 91/413 |
|---|---|---|---|
| 2,998,025 | 8/1961 | MacDuff | 91/413 |
| 3,137,311 | 6/1964 | Rohweder | 192/109 F |
| 3,613,844 | 10/1971 | Asano et al. | 192/13 R |
| 3,696,897 | 10/1972 | Kitano et al. | 192/13 R |
| 3,742,971 | 7/1973 | Worthington | 137/624.27 |
| 3,850,273 | 11/1974 | Murakami | 192/4 A |
| 3,948,366 | 4/1976 | Kitano et al. | 192/13 R |
| 3,972,398 | 8/1976 | Chamberlain | 192/4 A |

*Primary Examiner*—Martin F. Schwadron
*Assistant Examiner*—G. L. Walton
*Attorney, Agent, or Firm*—Dressler, Goldsmith, Clement, Gordon & Shore, Ltd.

[57] ABSTRACT

A regulating valve for controlling the flow of fluid from a source to a fluid operated clutch and brake as well as auxiliary devices is disclosed herein. The regulating valve incorporates a hydraulic detent which locks the valve spool in a clutch engaged position in response to the pressurized fluid delivered to the clutch so that the clutch is automatically released when a loss of hydraulic pressure occurs.

11 Claims, 3 Drawing Figures

REGULATING VALVE WITH HYDRAULIC DETENT

BACKGROUND OF THE INVENTION

The present invention relates to an improvement in hydraulic control valves and more particularly to a control valve used for a hydraulic clutch and hydraulic brake operation like a power take-off shaft in agricultural tractors.

Most conventional agricultural tractors incorporate a power take-off shaft that is used to drive accessory equipment such as trailing implements, which must be power driven. In recent years, the power take-off shafts have been connected to a power source, such as an engine, through a hydraulically actuated clutch. The power take-off shaft also incorporates a hydraulically actuated brake which prevents rotation of the shaft when it is not desired.

Recently, it has been proposed to operate the clutch and brake associated with a power take-off shaft with a single valve to simultaneously engage the clutch and disengage the brake and vice versa. It has also been found desirable to use a detent mechanism for holding the control valve in one position or another. Historically, detent mechanisms have been of the mechanical type, such as a spring detent in which the spring force can be manually overcome. However, spring detents have the disadvantage in that the valve remains in a certain position until a manual force is applied by the operator.

For safety reasons, it is desirable to have the control valve automatically move to a clutch disengaged position when the hydraulic system no longer supplies fluid, such as when the engine is stopped. This prevents accidental starting of the engine when with the power take-off shaft engaged which may result in injury to a person adjacent the vehicle.

U.S. Pat. No. 3,722,542 discloses an automatic pressure control valve for controlling the flow of fluid under pressure to the clutch and brake of a power take-off shaft. The control valve disclosed in the above-mentioned patent incorporates a hydraulic lock for holding the valve in an actuated position and the valve is arranged so that it automatically disengages the clutch and engages the brake when power is lost. Thus, the clutch is always disengaged when the system no longer supplies pressurized fluid. However, one of the problems encountered with the control valve of the above-mentioned type is the fact that, when the operator wants to manually disengage the power take-off shaft, it is necessary to exert a large force on the control lever to force the trapped fluid from the end of the valve spool through a restricted orifice in order for the operator to move the spool to the neutral position. This may be a hazardous condition, particularly when the operator wishes to rapidly disengage the power take-off shaft. Another problem inherent in the construction of the control valve is the complicated arrangement required for gradually increasing the pressure of the fluid as the clutch is being actuated.

It has also been proposed to utilize hydraulically actuated detent mechanism. U.S. Pat. No. 3,869,107 discloses a detent system wherein the detents are moved through the use of a separate pilot pressure source. The system disclosed in this patent not only requires a separate fluid source for moving the detent plungers but also requires an additional pilot valve and a complicated plumbing system which increases the overall cost of the system.

SUMMARY OF THE INVENTION

According to the present invention, there is provided an extremely simple control valve which not only is capable of progressively increasing the pressure of the fluid to a clutch that forms part of a power take-off shaft, but also allows the same control valve to be utilized for supplying pressurized fluid to other hydraulically operated equipment.

More specifically, the control valve of the present invention is adapted to be interposed between a pump, reservoir, power take-off clutch and a power take-off brake. The valve consists of a housing that has an elongated bore with a valve spool slidable in the bore. An inlet passage, a brake passage and a clutch passage are positioned at axially spaced locations surrounding the bore and the valve spool is movable to connect the inlet passage to either the clutch passage or the brake passage.

According to the primary aspect of the invention, the valve bore and inlet passage are interconnected at a second location by a detent passage which has a detent element slidable therein that cooperates with a groove on the periphery of the valve spool to hydraulically lock the valve spool in a position corresponding to the clutch engaged position. This is accomplished by utilizing a common passage for supplying pressurized fluid to both the clutch and the detent element. The control valve, more particularly the valve spool, also has a unique interconnection between the clutch passage and the reservoir with a modulating valve therein which automatically progressively increases the pressure of the fluid in the clutch passage when the valve spool is initially positioned to engage the clutch.

The control valve of the present invention further incorporates a pressure regulating valve located in the inlet passage which maintains a predetermined pressure for the fluid delivered to the inlet passage and any excess fluid is automatically diverted to a further passage for use in contrlling additional auxiliary equipment. The control valve is also designed so that the inlet passage is connected to a control valve that forms part of the transmission so that the fluid utilized for actuating the clutch and brake of the power takeoff shaft can also be utilized for actuating the transmission. The control valve is designed so as to provide priority fluid flow to the transmission before any of the other elements can be maintained pressurized.

DETAILED DESCRIPTION

Figure 1:
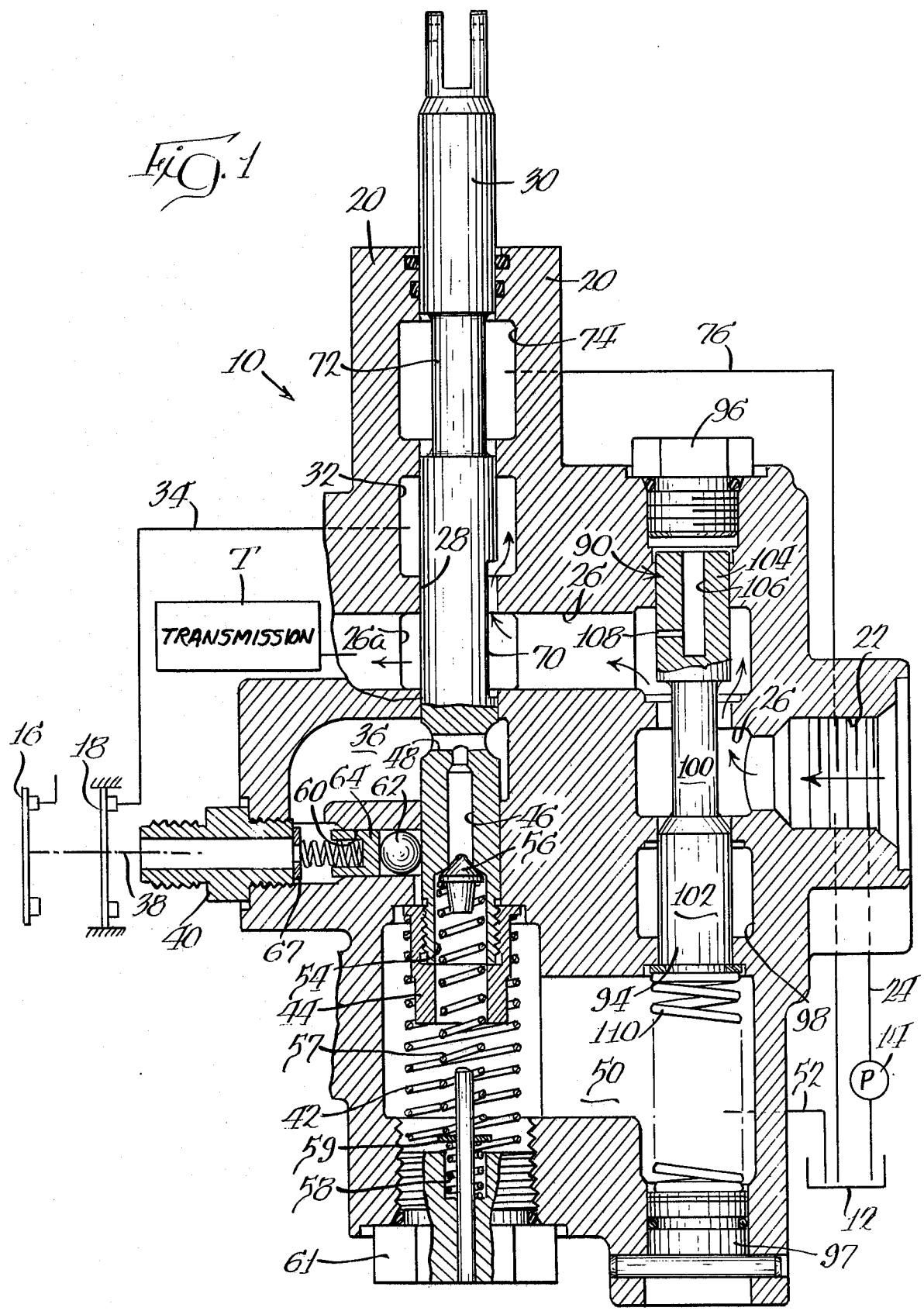
FIG. 1 discloses a sectional view of a control valve constructed in accordance with the teachings of the present invention.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated. FIG. 1 of the drawings discloses a control valve, generally designated by the reference numeral 10, that is interposed between a reservoir 12, a pump 14, a power take-off clutch 16 and a power take-off brake 18. Control valve 10 consists of a valve housing 20 that has an inlet port 22 connected to pump 14 through conduit 24. Inlet port 22 communicates with an inlet passage 26 with part of the inlet passage defined by a regulator bore, which will be described later. Inlet passage 26 has an enlarged portion 26a surrounding a valve bore 28 that is formed in valve housing 20 with a valve spool 30 slidably supported in valve bore 28. Housing 20 also has a brake passage 32 in communication with valve bore 28 and located on one side of inlet passage 26. Brake passage 32 is connected to brake 18 through a conduit 34. A clutch passage 36 is formed in housing 20 and communicates with bore 28 on the opposite side of inlet passage 26. Clutch passage 36 is connected to clutch 16 through conduit 38 and threaded insert 40.

Valve spool 30 is normally biased to a first position illustrated in FIG. 1 by a biasing spring 42 that is received over the periphery of a spool stop 44 which is received on the lower end of valve spool 30. Valve spool 30 also has an axial bore 46 and a transverse bore 48 which cooperate to define opening means extending from clutch passage 36 to reservoir 12 through a further or reservoir passage 50 and a conduit 52. Axial opening 46 has an enlarged portion 54 extending from the lower end of valve spool and defines a valve seat for a pressure modulating valve 56 that is normally biased by a first or primary spring 57 and a second or secondary spring 58 that are axially aligned with each other and separated by a washer 59. The purpose of the modulating valve will be described in detail later.

According to the primary aspect of the present invention, control valve 10 incorporates a detent passage 60 between clutch passage 36 and bore 28. As more clearly shown in FIG. 3, detent passage 60 has a detent element consisting of a ball 62 that is biased toward valve spool 30 by biasing means that includes a detent spool 64 and a spring 66 which is received into the hollow detent spool and has its opposite end engaging washer 67.

Valve spool 30 also has a circumferential groove 68 that has a radius corresponding to one-half the diameter of ball 62 and groove 68 is aligned with cross bore 48 while bore 28 has a cut-out portion 69 which interconnects the inner end of detent passage 60 with reservoir passage 50. Valve spool 30 also has a flat elongated notch 70 on the periphery therof and a reduced section 72 on the opposite end thereof.

Valve housing 20 (FIG. 1) has a further reservoir passage 74 located adjacent brake passage 28 and connected to reservoir 12 through line 76. Control valve 10 also has pressure regulating means 90 in the inlet passage for maintaining a predetermined pressure for the fluid flowing through inlet passage 26 and also provides for utilizing any excess fluid for controlling other hydraulically actuated auxiliary equipment.

Figure 2:
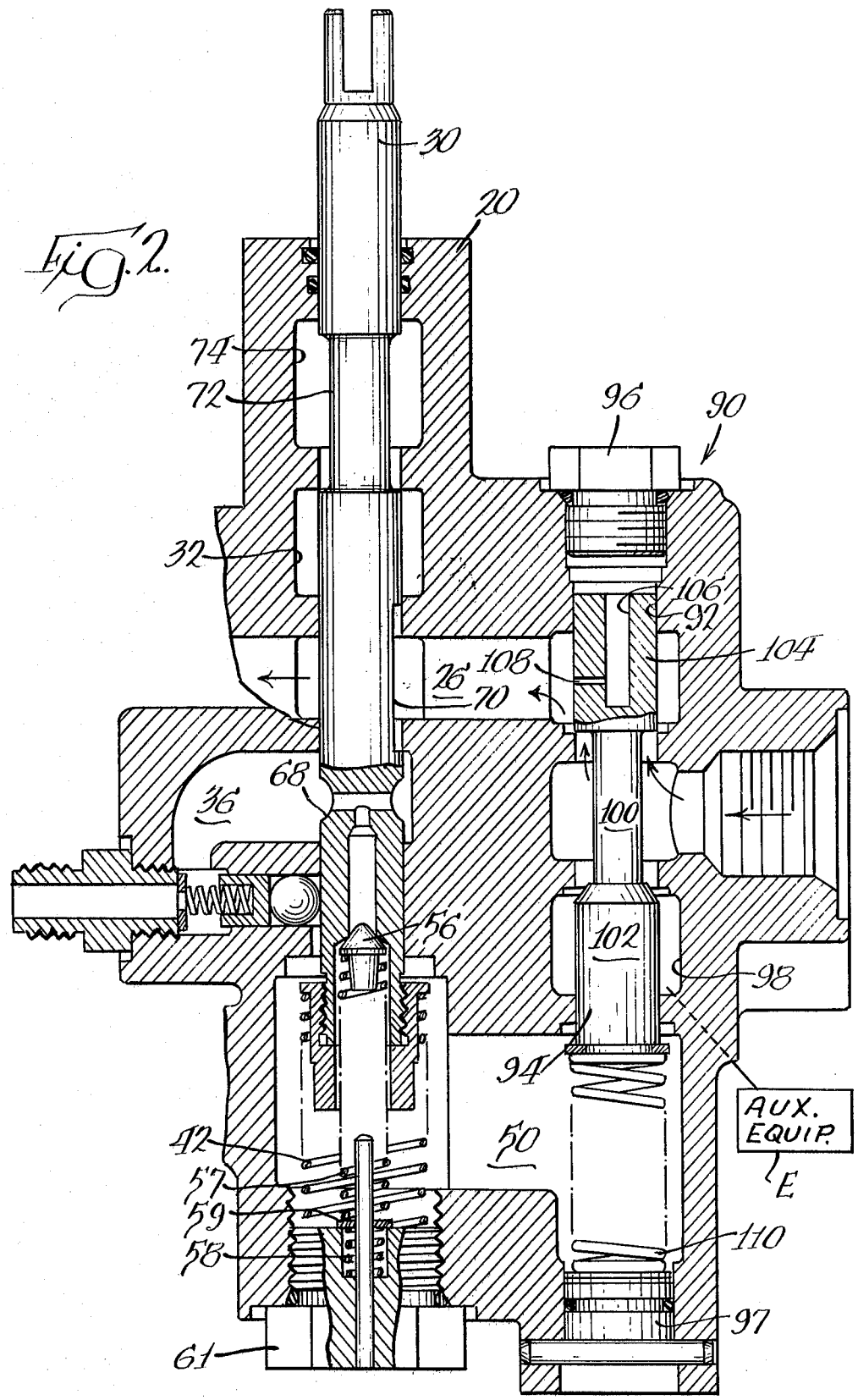
FIG. 2 is a view similar to FIG. 1 showing the valve spool in an intermediate position.

As most clearly shown in FIG. 2, regulating means 90 consists of a valve bore 92 extending through housing 20 with a valve spool 94 slidable in bore 92. The upper end of valve bore 90 is closed by a cap screw 96 while the lower end is closed by a plug 97 and is in communication with reservoir passage or chamber 50. As can be seen from FIG. 2, a portion of valve 92 defines a portion of inlet passage 26. In other words, valve regulator bore 92 intersects inlet passage 26 and has a further passage 98 located adjacent inlet 26. Valve spool 94 has a reduced portion 100 and lands 102 and 104 on opposite ends of reduced portion 100. Land 104 has an axial opening 106 as well as a transverse opening 108. Openings 106 and 108 define communication means between inlet passage 26 and bore 92 adjacent the upper end of valve spool 94.

Valve spool 94 is normally biased to a raised position by a spring 110 that engages the lower end of the spool. In this position, illustrated in FIG. 1, land 102 blocks flow between inlet passage 26 and further passage 98.

The operation of the control valve is believed to be understood from the above description but will be briefly summarized.

Assuming that the pump has just been actuated, pressurized fluid is delivered from reservoir 12 through conduit 24 to inlet passage 26. This pressurized fluid passes through openings 106 and 108 into the chamber formed between cap screw 96 and regulator spool 94. The pressurized fluid also is delivered to auxiliary equipment such as transmission T and can be utilized for operating hydraulically actuated valves in the transmission. The pressurized fluid also passes through the restricted orifice defined by notch 70 into brake chamber 32 and through line 34 to actuate brake 18. Valve spool 30 will remain in this position because of the bias of spring 42 on the lower end of the valve which biases spool 30 as well as spool stop 44 to the position illustrated in FIG. 1.

Assuming that no fluid is needed for actuating any parts of the transmission, the pressure will rapidly build up in inlet port 22 and the pressurized fluid will be received into the chamber between valve spool 94 and cap screw 96 and will ultimately overcome the force of spring 110 to move regulator valve spool 94 downward from the position illustrated in FIG. 1 to that illustrated in FIG. 2. In this position, inlet port 22 is placed in communication with auxiliary passage 98 and fluid is therefore available to operate auxiliary equipment E, such as the hydraulic draft control system which normally forms part of an agricultural tractor.

Figure 3:
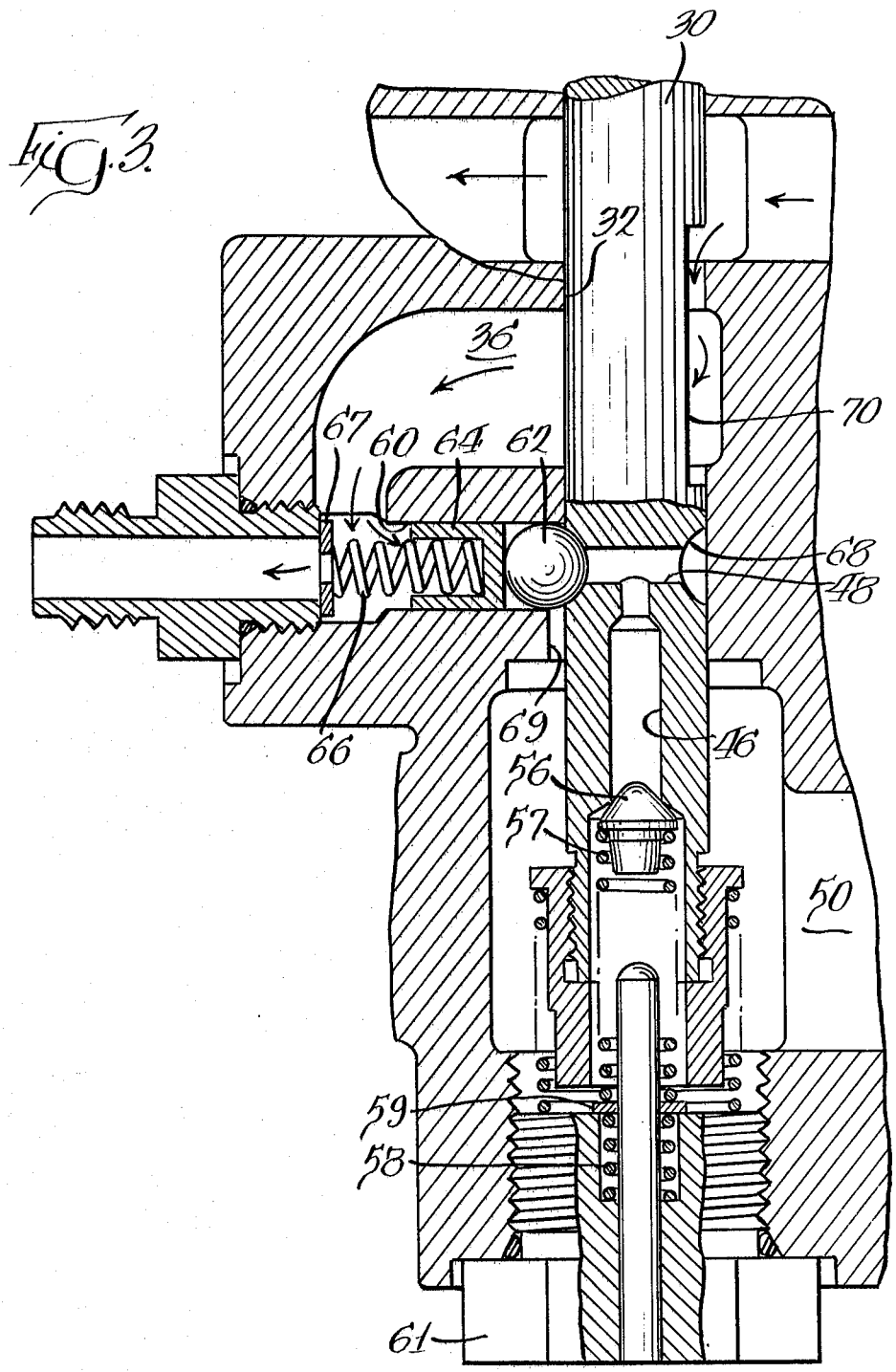
FIG. 3 is an enlarged fragmentary sectional view showing the valve spool in a second position where the spool is hydraulically locked.

Assuming now that the operator wishes to actuate the power take-of shaft, a control lever (not shown) connected to valve spool 30 is operated to move valve spool 30 from the first position illustrated in FIG. 1 towards a second position, illustrated in FIG. 3. During this movement, valve spool 30 will be moved through the intermediate stage illustrated in FIG. 2. It will be noted that in this position, the communication between inlet passage 26 and brake passage 32 has been blocked by valve spool 30 while the reduced portion 72 of valve spool 30 places brake passage in communication with reservoir passage 74. This insures that the brake is disengaged before the clutch is engaged.

Further downward movement of valve spool 30 from the position illustrated in FIG. 2 will place inlet passage 26 in communication with clutch passage 36 through flat notch 70 which defines a restricted orifice. Because the force of secondary spring 58 is extremely low, fluid received into clutch chamber 36 will act to open or unseat valve element 56 which, therefore, acts as a modulating valve to progressively increase the pressure of the fluid in clutch passage 36. As the valve spool continues its downward movement, washer 59 will seat on plug 61 and spring 58 can no longer be compressed. At this point the primary spring 57 with a greater spring force will act to seat valve element 56. Thus, springs 57 and 58 cooperate to allow the pressure to clutch 16 to build up slowly and prevent "shock loading" of the clutch.

The valve spool ultimately is moved to the position illustrated in FIG. 3 wherein groove 68 is aligned with detent passage 60. Of course, it will be appreciated that at this point, fluid flow between clutch passage 36 and reservoir passage 50 is blocked so that the clutch passage is now pressurized to the full pressure of the fluid in inlet passage 26. This fluid is delivered through the opening in washer 67 to clutch 16 and engages the clutch. The pressurized fluid in clutch passage 36 also acts on detent element 64 and forces ball 62 into engagement with groove 68 to hydraulically lock the valve spool 30 in its second position illustrated in FIG. 3. It should be noted that in this position, the area of detent passage 60 between detent eklement 64 and spool 30 is in direct communication with reservoir passage 50 through groove 69 so that any pressurized fluid that leaks past detent element 64 will automatically be returned to the reservoir.

Thus, should hydraulic pressure be lost in inlet passage 26, for any reason, the force of spring 42 will overcome the force of spring 66 and cause ball 62 to move out of groove 68 so that the valve is automatically returned to the position illustrated in FIG. 1 wherein the clutch 16 is disengaged and brake 18 is engaged.

As can be appreciated from the above description, the unique control valve provides an extremely simple construction which is capable of automatically disengaging the clutch whenever pressure from pump 14 drops below a given level. In addition, the improved detent construction for holding the valve spool in the detented position substantially reduces the forces required to overcome the hydraulic detent when the valve is to be operated manually.

What is claimed is:

1. A control valve for controlling flow between a pump, reservoir, power take-off clutch and power take-off brake comprising a valve housing having a valve bore therein with one end of said bore connected to said reservoir, an inlet passage communicating with said bore and connected to said pump, a brake passage communicating with said bore on one side of said inlet passage and connected to said brake, a clutch passage communicating with said valve bore on an opposite side of said inlet passage and connected to said clutch, a detent passage in direct communication with said clutch passage and said bore, a detent element in said detent passage, a valve spool slidable in said bore and biased to a first position interconnecting said inlet passage with said brake passage, opening means in said valve spool connecting said clutch passage with said reservoir when said valve spool is in said first position, groove means on the periphery of said valve spool, said groove means being aligned with said detent passage when said valve spool is in a second position, said inlet passage being connected to said clutch passage in said second position while said brake passage is connected to said reservoir and flow from said clutch passage to said reservoir is prevented so that said clutch passage is pressurized and said detent element is held in engagement with said groove means by the pressure of fluid in said clutch passage.

2. A control valve as defined in claim 1, in which said detent element includes a ball in said passage with biasing means said ball toward said valve spool.

3. A control valve as defined in claim 2, in which said biasing means includes a detent spool slidable in said bore and a spring biasing said detent spool into engagement with said ball.

4. A control valve as defined in claim 3, further including passage means connecting said reservoir to said detent passage between said detent spool and said bore.

5. A control valve as defined in claim 3, further including pressure regulating means in said inlet passage.

6. A control valve as defined in claim 5, in which said inlet passage is connected to an auxiliary unit for supplying pressurized fluid thereto.

7. A control valve as defined in claim 5, in which said pressure regulating means includes a regulator bore intersecting said inlet passage with a regulator spool slidable in said regulator passage, biasing means on one end of said regulator spool biasing said spool to a first position, communicating means between said inlet passage and said regulator bore adjacent an opposite end of said regulator spool so that said regulator spool is moved as a function of the pressure of fluid in said inlet passage, and a further passage in communication with said regulator bore and connected to said inlet passage when the pressure in said inlet passage exceeds a certain level.

8. A control valve as defined in claim 1, in which said opening means has modulating valve means therein which acts to progressively increase the pressure of fluid received in said clutch passage when said inlet passage is initially connected to said clutch passage.

9. A control valve as defined in claim 8, in which said valve spool has an elongated notch in the peripheral surface defining a restricted opening between said inlet passage and said brake passage and clutch passage in the respective positions of said valve spool.

10. A control valve as defined in claim 9, further including a reservoir passage in communication with said bore adjacent said brake passage with said valve spool having a reduced portion, said reduced portion and elongated notch being positioned so that flow from said inlet passage to said brake passage is blocked before said inlet passage is connected to said clutch passage as said valve spool is moved from said first position toward said second position and said brake passage is connected to said reservoir.

11. A control valve as defined in claim 8, in which said modulating valve means includes a modulating valve element and biasing means cooperating with said modulating valve element, said biasing means including a primary spring and a secondary spring for biasing said modulating valve element to a seated position.

* * * * *

UNITED STATES PATENT AND TRADEMARK OFFICE
CERTIFICATE OF CORRECTION

PATENT NO. : 4,083,382
DATED : April 11, 1978
INVENTOR(S) : RAMKISHAN KHATTI and DONALD K. JOHNSON It is certified that error appears in the above-identified patent and that said Letters Patent are hereby corrected as shown below:

```
Column 1, line 36, delete "when".
Column 1, line 55, after "be" insert --a--.
Column 2, line 42, "contrlling" should be --controlling--.
Column 3, line 67, after "valve" insert --bore--.
Column 4, line 44, "take-of" should be --take-off--.
Column 5, line 17, "eklement" should be --element--.
Column 6, line 7, after "means" insert --biasing--.
```

Signed and Sealed this

Fifteenth Day of August 1978

[SEAL]

Attest:

RUTH C. MASON
*Attesting Officer*

DONALD W. BANNER
*Commissioner of Patents and Trademarks*